(12) United States Patent
Amador et al.

(10) Patent No.: US 10,557,359 B2
(45) Date of Patent: Feb. 11, 2020

(54) SEAL ASSEMBLY

(71) Applicant: UNITED TECHNOLOGIES CORPORATION, Farmington, CT (US)

(72) Inventors: Armando Amador, Wethersfield, CT (US); Nasr A. Shuaib, Watertown, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 293 days.

(21) Appl. No.: 15/342,886

(22) Filed: Nov. 3, 2016

(65) Prior Publication Data

US 2018/0119557 A1    May 3, 2018

(51) Int. Cl.
*F01D 11/00* (2006.01)
*F16J 15/00* (2006.01)
(Continued)

(52) U.S. Cl.
CPC .............. *F01D 11/003* (2013.01); *F01D 5/02* (2013.01); *F01D 9/065* (2013.01); *F01D 11/001* (2013.01);
(Continued)

(58) Field of Classification Search
CPC .......... F01D 11/003; F01D 11/00; F01D 5/02; F01D 25/162; F01D 25/183; F01D 25/16; F01D 25/186; F04D 29/053; F04D 29/056; F04D 29/063; F04D 29/083; F04D 29/102; F04D 29/321; F04D 29/0563; F04D 29/061; F04D 29/06; F04D 29/08; F04D 29/10; F16J 15/3288; F16J 15/4472;
(Continued)

(56) References Cited

U.S. PATENT DOCUMENTS 6,027,121 A * 2/2000 Cromer .................. F16J 15/442
                                                    277/347
6,131,910 A   10/2000 Bagepalli
(Continued)

FOREIGN PATENT DOCUMENTS

EP    3048344    7/2016
EP    3190267    7/2017
(Continued)

OTHER PUBLICATIONS

European Patent Office, European Search Report dated Mar. 4, 2019 in Application No. 17194916.7.
(Continued)

*Primary Examiner* — Nathan Cumar
(74) *Attorney, Agent, or Firm* — Snell & Wilmer L.L.P.

(57) ABSTRACT

A seal assembly for a rotatable component having an axis of rotation. The seal assembly may include a first seal mounted to a housing and configured to be in sealing engagement with the rotatable component, a second seal mounted to the housing an axial distance apart from the first seal and configured to be in sealing engagement with the rotatable component, wherein the axial distance is parallel with the axis of rotation, a buffer fluid chamber defined between the first seal and the second seal, and a buffer fluid inlet in fluid providing communication with the buffer fluid chamber.

20 Claims, 5 Drawing Sheets

(51) Int. Cl.
  F01D 11/02      (2006.01)
  F02C 7/28       (2006.01)
  F01D 9/06       (2006.01)
  F01D 5/02       (2006.01)
  F01D 25/16      (2006.01)
  F01D 25/18      (2006.01)
  F04D 29/053     (2006.01)
  F04D 29/056     (2006.01)
  F04D 29/063     (2006.01)
  F04D 29/08      (2006.01)
  F04D 29/10      (2006.01)
  F04D 29/32      (2006.01)
  F16J 15/3288    (2016.01)
  F16J 15/447     (2006.01)

(52) U.S. Cl.
  CPC ............ F01D 11/02 (2013.01); F01D 25/162 (2013.01); F01D 25/183 (2013.01); F02C 7/28 (2013.01); F04D 29/053 (2013.01); F04D 29/056 (2013.01); F04D 29/063 (2013.01); F04D 29/083 (2013.01); F04D 29/102 (2013.01); F04D 29/321 (2013.01); F16J 15/004 (2013.01); F16J 15/3288 (2013.01); F16J 15/4472 (2013.01); *F05D 2220/32* (2013.01); *F05D 2240/56* (2013.01); *F05D 2240/60* (2013.01)

(58) Field of Classification Search
  CPC .......... F16J 15/004; F16J 15/00; F16J 15/002; F16J 15/162; F16J 15/40; F05D 2220/32; F05D 2240/56; F05D 2240/60
  USPC .......................................................... 277/351
  See application file for complete search history.

(56) References Cited

U.S. PATENT DOCUMENTS

| 6,257,586 B1 | 7/2001 | Skinner | |
| 6,428,009 B2 | 8/2002 | Justak | |
| 6,502,824 B2 | 1/2003 | Mayer | |
| 7,093,418 B2* | 8/2006 | Morris | F01D 25/125 |
| | | | 184/6.11 |
| 2005/0271504 A1* | 12/2005 | Ferra | F01D 5/081 |
| | | | 415/170.1 |
| 2008/0001364 A1* | 1/2008 | Anderson | F01D 25/16 |
| | | | 277/500 |
| 2008/0008574 A1* | 1/2008 | Brillert | F04D 29/164 |
| | | | 415/1 |
| 2012/0328418 A1* | 12/2012 | Yang | F01D 25/186 |
| | | | 415/170.1 |
| 2014/0035238 A1* | 2/2014 | Richie | F16J 15/441 |
| | | | 277/559 |

FOREIGN PATENT DOCUMENTS

| GB | 2366842 | * | 3/2002 | ............ F01D 11/04 |
| WO | 2005001316 | | 1/2005 | |

OTHER PUBLICATIONS

European Patent Office, European Search Report dated Mar. 27, 2018 in Application No. 17194916.7-1006.

* cited by examiner

SEAL ASSEMBLY

FIELD

The present disclosure relates to seal assemblies, and more specifically, to seal assemblies of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Gas turbine engines generally include one or more bearing systems that support rotation of various components relative to an engine static structure or engine case. Seals are generally utilized in conjunction with bearing systems to protect the bearings and other bearing components from the surrounding hostile air environment and/or to contain the oil within a compartment of the bearing system. Conventional seals may leak, thereby allowing oil to weep our through the seal and travel into the compressor section or turbine section of a gas turbine engine. For example, bleeding oil into the compressor section may lead to imbalance concerns or contamination, while bleeding into the turbine may affect the thermal operating conditions and/or the operating efficiency of the gas turbine engine.

SUMMARY

In various embodiments, the present disclosure provides a seal assembly for a rotatable component having an axis of rotation. The seal assembly may include a first seal mounted to a housing and configured to be in sealing engagement with the rotatable component, a second seal mounted to the housing an axial distance apart from the first seal and configured to be in sealing engagement with the rotatable component, wherein the axial distance is parallel with the axis of rotation, a buffer fluid chamber defined between the first seal and the second seal, and a buffer fluid inlet in fluid providing communication with the buffer fluid chamber.

In various embodiments, the first seal is a first brush seal and the second seal is a second brush seal. In various embodiments, the first seal is configured to separate a gas from a buffer fluid in the buffer fluid chamber. The second seal may be configured to separate the buffer fluid in the buffer fluid chamber from oil. In various embodiments, the second seal is configured to separate the buffer fluid in the buffer fluid chamber from an oil mist. The first seal and the second seal may be mechanically retained to the housing. In various embodiments, a spacer may be disposed between the first seal and the second seal. In various embodiments, the first seal and the second seal extend radially and thus perpendicularly to the axis of rotation.

Also disclosed herein, according to various embodiments, is a seal assembly of a bearing system of a gas turbine engine. The seal assembly may include a rotatable component having an axis of rotation, a static housing, a first seal mounted to the static housing in sealing engagement with the rotatable component, a second seal mounted to the static housing an axial distance apart from the first seal in sealing engagement with the rotatable component, a buffer fluid chamber defined between the first seal and the second seal, and a buffer fluid inlet in fluid providing communication with the buffer fluid chamber. In various embodiments, the buffer fluid inlet is configured to deliver buffer fluid through at least one of a wall of the static housing and a wall of the rotatable component.

According to various embodiments, the first seal is a first brush seal and the second seal is a second brush seal. The first brush seal may be configured to separate a gas from a buffer fluid in the buffer fluid chamber and the second brush seal may be configured to separate the buffer fluid in the buffer fluid chamber from oil in a bearing compartment of the gas turbine engine. For example, the second brush seal may be configured to separate the buffer fluid in the buffer fluid chamber from an oil mist in a bearing compartment of the gas turbine engine.

In various embodiments, the static housing has an annular structure that is concentric with the axis of rotation. In various embodiments, the static housing may comprise of a passage at a bottom portion of the annular structure configured to allow oil leaking through the second brush seal from the bearing compartment into the buffer fluid chamber to drain into the bearing compartment or the oil may be routed to a benign area of the gas turbine engine via drain tubes and/or drain passages. According to various embodiments, the seal assembly further includes at least one labyrinth seal configuration. The labyrinth seal configuration may be a stepped configuration, a straight configuration, and/or may have at least one canted knife edge.

Also disclosed herein, according to various embodiments, is a method of sealing a bearing system of a gas turbine engine. The method may include retaining a first brush seal an axial distance apart from a second brush seal and flowing a buffer fluid into a buffer fluid chamber defined between the first brush seal and the second brush seal.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Figure 1:
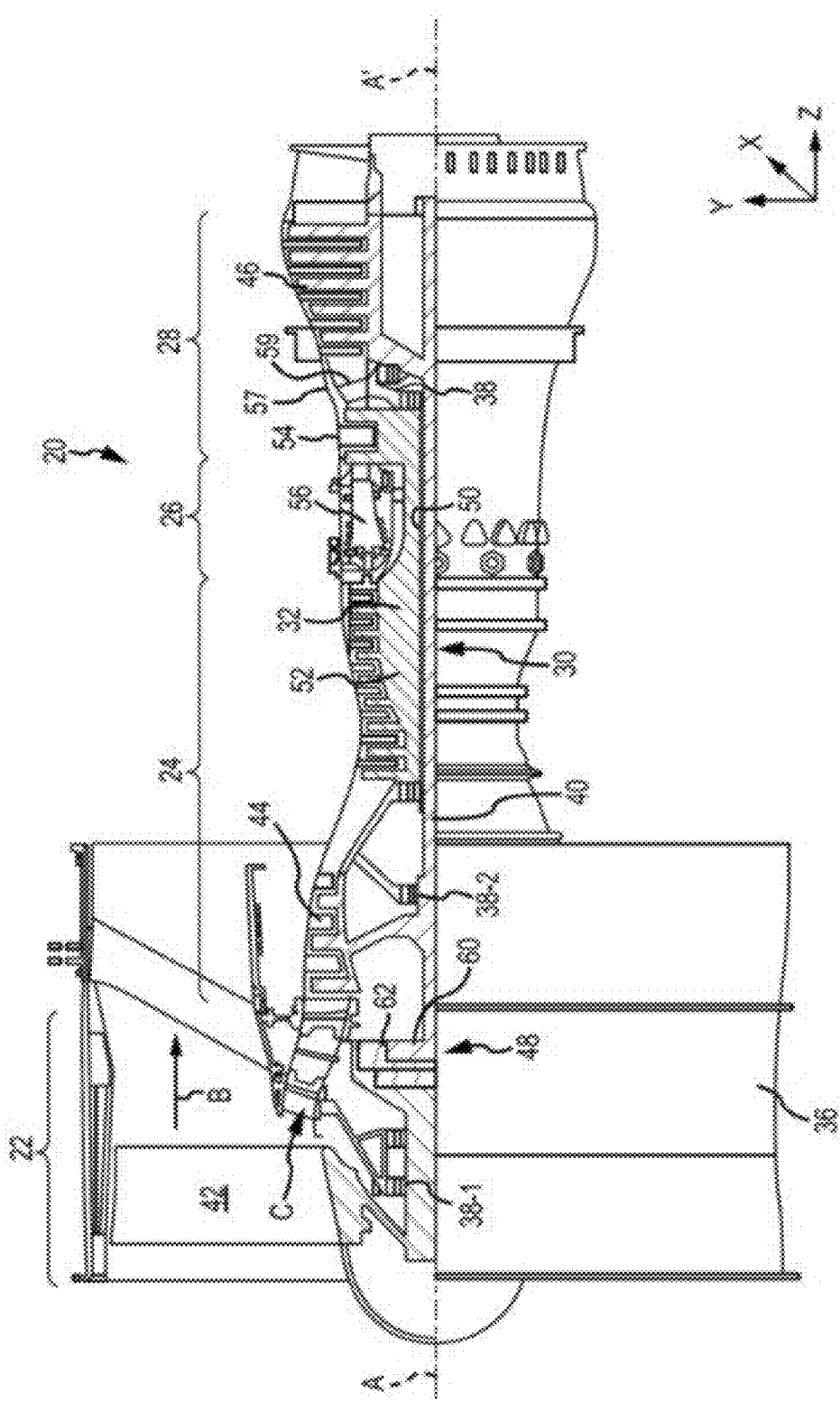
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (i.e., a sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
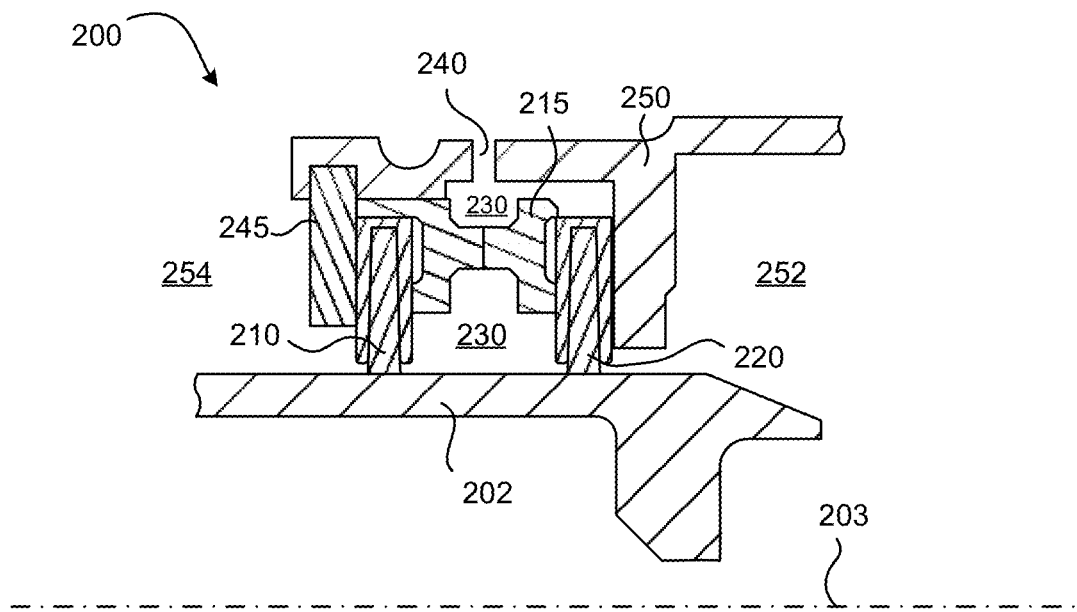
FIG. 2 illustrates a cross-sectional view of a seal assembly, in accordance with various embodiments.

Throughout the present disclosure, like numerals denote like elements. In various embodiments, and with reference to FIG. 2, a seal assembly 200 is disclosed herein. The seal assembly 200 includes, according to various embodiments, a first seal 210, a second seal 220, a buffer fluid chamber 230, and a buffer fluid inlet 240. The first seal 210 and the second seal 220 are mounted to a housing 250 (e.g., a static housing, such as an engine case or other static structure in the gas turbine engine) and configured to be in sealing engagement with a rotatable component 202, in accordance with various embodiments. The rotatable component 202 is configured to rotate about an axis of rotation 203. The rotatable component 202 may be any of various rotors in the gas turbine engine 20. For example, the rotatable component 202 may be a rotating shaft of the low speed spool 30 or the high speed spool 32 discussed above. In various embodiments, rotatable component 202 may be a runner sleeve that is pressed or otherwise fitted to a rotating shaft. Generally, the bearing systems 38, 38-1, and 38-2 (FIG. 1) and the seal assembly 200 described herein are configured to support and interface with the rotatable component 202, which, as mentioned above, may be any rotating structure of the gas turbine engine 20.

The seal assembly 200 may be configured to contain various fluids in respective compartments, regions, or sections of the gas turbine engine 20. For example, a bearing compartment 252 of a bearing system may be referred to as a "wet" zone because such a region may be in fluid contact with oil and/or other liquids, such as lubricants, coolants, etc. In various embodiments, the bearing compartment 252 may include a mixture of oil and another fluid, such as air. The mixture of air and oil, for example, may be an air-oil mist. Other regions in the gas turbine engine 20, such as region 254, may benefit from being oil-free and thus may be referred to as "dry" zones. The seal assembly 200 of the present disclosure, therefore, is configured to separate the bearing compartment 252 from other areas (e.g., "dry" regions 254), in accordance with various embodiments. That is, the seal assembly 200 may be utilized, for example, to cap the bearing compartment 252 (e.g., sump) for effective oil containment and to preclude hot air ingestion into the bearing compartment 252. The relative orientation of the bearing compartments 252, 254 is not limited to the configuration shown in the figures. That is, in various embodiments bearing compartment 252 may be the "dry" zone and bearing compartment 254 may be the "wet" zone.

In various embodiments, the first seal 210 and the second seal 220 are brush seals. Accordingly, in various embodiments, the first and second seals 210, 220 may each include a plurality of bristles extending in a substantially radial direction (e.g., perpendicularly with respect to the axis of rotation 203). The bristles of the seals 210, 220 may be made from metallic or non-metallic materials, or combinations thereof, and the rotatable component 202, or at least the region/surface of the rotatable component 202 to which the seals 210, 220 are in sealing engagement, may be made from a metallic, non-metallic, abrade-able, non-abrade-able material, or combinations thereof.

The first seal 210 and the second seal 220 may be spaced an axial distance apart from each other. That is, the first seal 210 and the second seal 220 are not in direct juxtaposed contact with each other but instead are disposed so there is an axial gap or an axial distance, parallel with the axis of rotation 203, between the two seals 210, 220, in accordance with various embodiments. This space between the two seals 210, 220 is referred to herein as a buffer fluid chamber 230. The buffer fluid chamber 230 is defined by the two seals 210, 220. In various embodiments, a spacer 215 may be disposed in the buffer fluid chamber 230 to support the seals 210, 220 and facilitate retention relative to each other. The spacer 215 may include holes, slots, apertures, or other passageways to allow buffer air to pressurize the buffer fluid chamber 230.

In various embodiments, the two seals 210, 220 are mechanically retained to the housing 250. For example, one or more retaining devices/elements 245 may be mounted to or received into the static housing 250. The retaining element 245 may securely retain the seals 210, 220 relative to housing 250. In various embodiments, the retaining element 245 may include one or more retaining rings, wires, nut(s), bolts, etc. In various embodiments, the seal assembly 200 may include a spacer 215 that is disposed in the buffer fluid chamber 230 and that is configured to, in conjunction with the one or more retaining elements 245, mechanically retain the seals 210, 220 in static engagement with the static housing 250.

Figure 3:
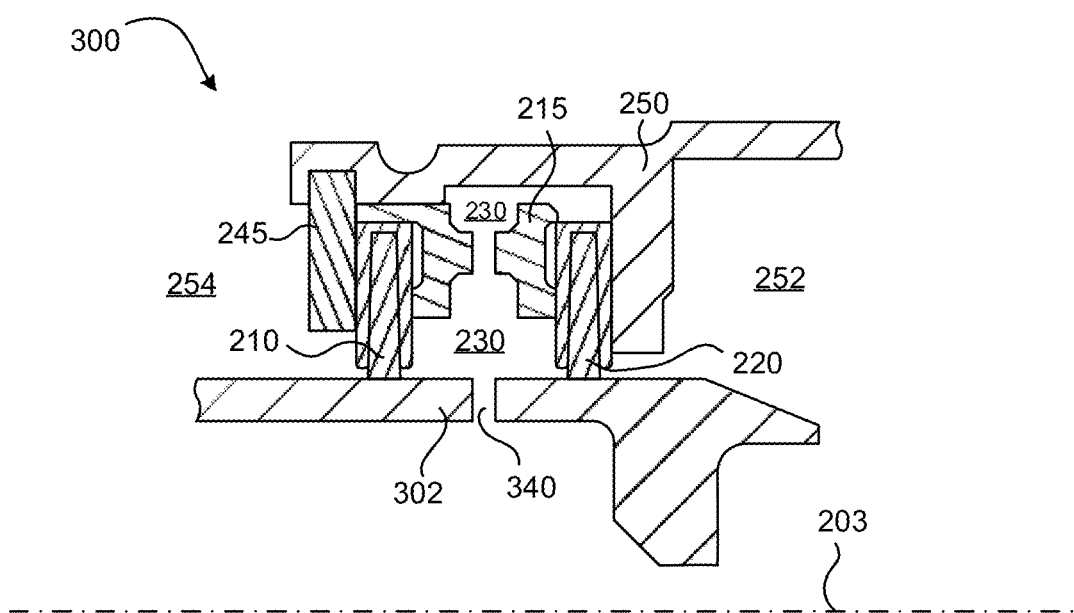
FIG. 3 illustrates a cross-sectional view of a seal assembly, in accordance with various embodiments.

In various embodiments, the seal assembly 200 includes one or more buffer fluid inlets 240 that are in fluid providing communication with the buffer fluid chamber 230. Said differently, a buffer fluid is configured to flow through the one or more buffer fluid inlets 240 and into the buffer fluid chamber 230. In various embodiments, the buffer fluid may be air or a combustion gas. In various embodiments, and with reference to FIG. 2, the buffer fluid inlet 240 may be formed in or extend through one or more walls of the housing 250. That is, the buffer fluid may be delivered from a radially outward source and may be configured to move radially inward through the one or more walls of the housing 250 to enter the buffer fluid chamber 230. In various embodiments, and with reference to the seal assembly 300 of FIG. 3, the buffer fluid inlet 340 may be formed in or extend through one or more walls of the rotatable component 302. That is, the buffer fluid may be delivered from a radially inward source and may be configured to move radially outward through the one or more walls of the rotatable component 302 to enter the buffer fluid chamber 230. In various embodiments, the seal assembly may include a buffer fluid inlet disposed in both the housing (e.g., 250 of FIG. 2) and the rotatable component (e.g., 302 of FIG. 3).

The buffer fluid chamber 230 may be maintained, via delivery of buffer fluid through the one or more buffer fluid inlets 240/340, at a higher pressure than the "dry" region 254 and the bearing compartment 252. Accordingly, the buffer fluid chamber 230 may be configured to facilitate containment of the oil within the bearing compartment 252 and may prevent ingestion of air and/or other gases into the bearing compartment 252. In various embodiments, the seal assembly 200 of the present disclosure does not contribute significantly to limiting rotor speed, tends to have little to no oil cooling needs, is compact in size, and facilitates the maintenance of a stable and/or robust pressure difference between "wet" and "dry" zones of the gas turbine engine 20.

Figure 4:
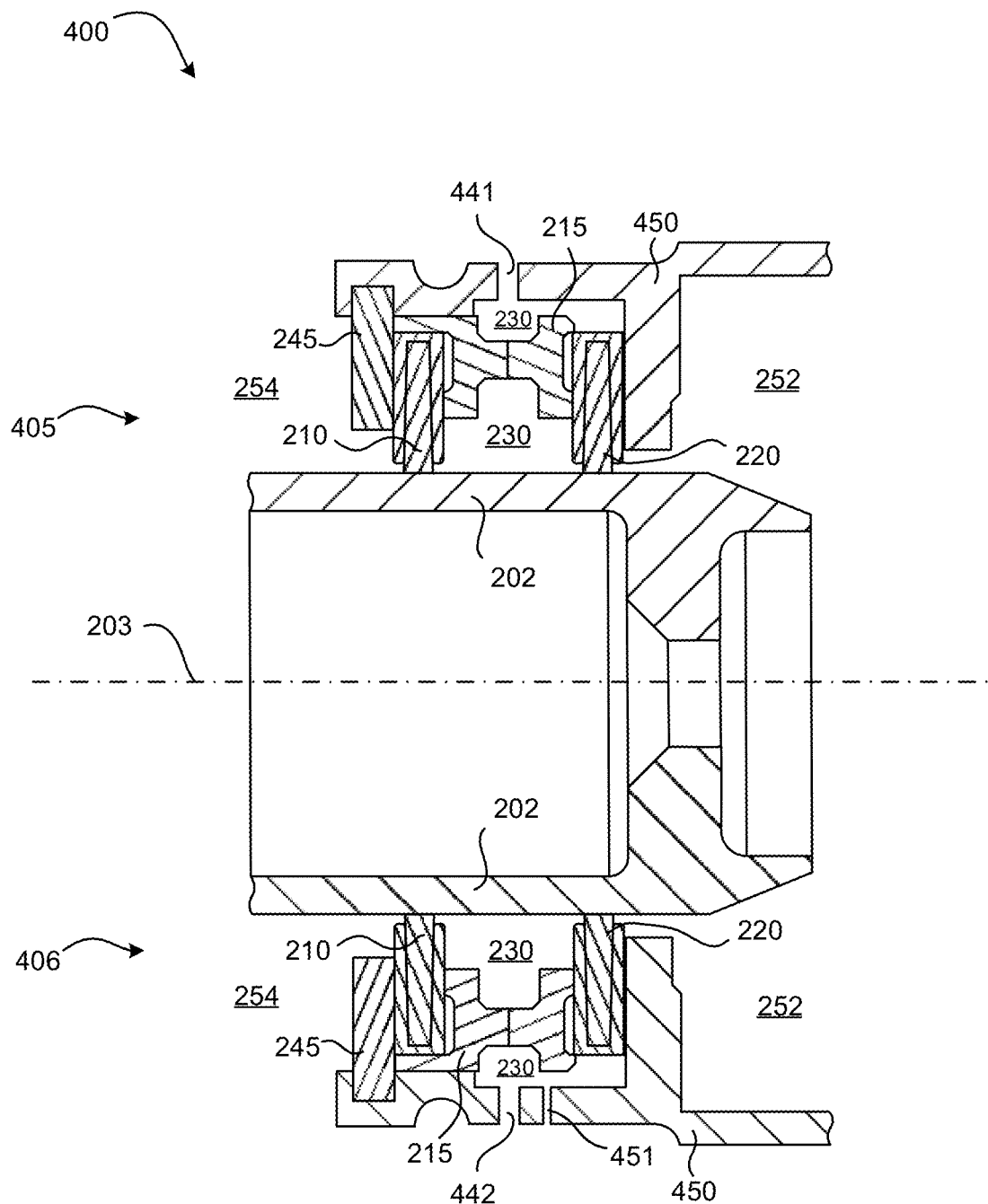
FIG. 4 illustrates a cross-sectional view of a seal assembly, in accordance with various embodiments.

In various embodiments, the seal assembly may include multiple buffer fluid inlets. In various embodiments, and with reference to FIG. 4, the seal assembly 400 may have an annular structure that circumscribes the axis of rotation 203. Accordingly, the cross-sectional view of the seal assembly 400 of FIG. 4 shows a top portion 405 and a bottom portion 406 of the seal assembly 400. The terms "top" and "bottom" may be relative to, for example, a standard orientation of the gas turbine engine 20. Thus, the bottom portion 406 of the seal assembly 400 may be the lowermost portion of the seal assembly 400 when an aircraft having the gas turbine engine 20 is in a horizontal orientation. Multiple buffer fluid inlets 441, 442 may be disposed in or extend through the housing 450 at various circumferential locations of the housing 450. Each buffer fluid inlet 441, 442 may be an orifice, a passage, a conduit, a tubes, a pipe, etc.

In various embodiments, the seal assembly 400 may include a passage 451 disposed in the bottom portion 406 of the housing 450 that is configured to return any leaked oil back into the bearing compartment 252 or the oil may be routed to a benign area of the gas turbine engine via drain tubes and/or drain passages. That is, in the event that any oil or other liquid leaks past the second seal 220 into the buffer fluid chamber 230, such leaked oil may drain to the lowermost section of the seal assembly 400 and may be flow through the passage 451 back into the bearing compartment 252.

Figure 5A:
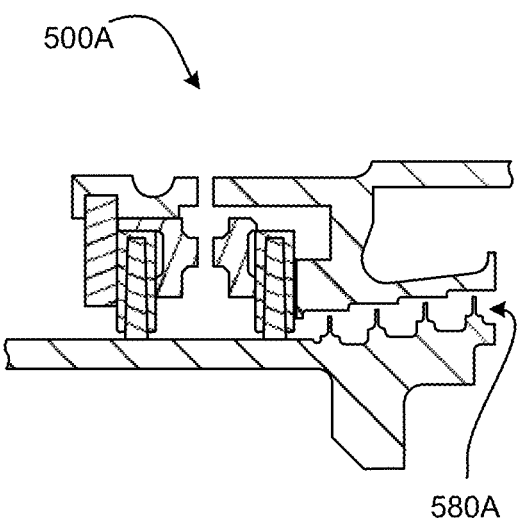
FIGS. 5A-5D illustrate cross-sectional views of seal assemblies having an additional labyrinth seal configuration, in accordance with various embodiments.
Figure 5B:
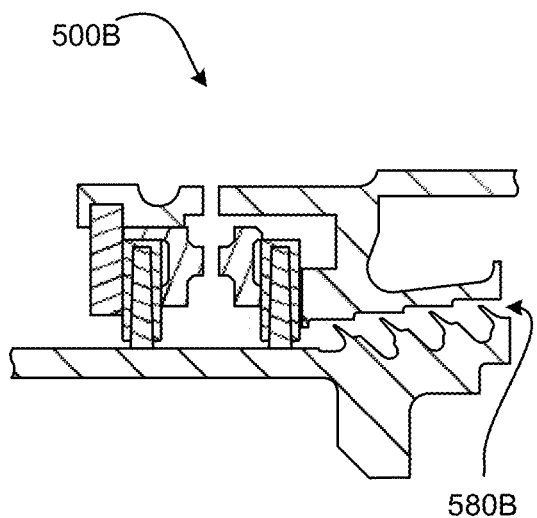
Figure 5C:
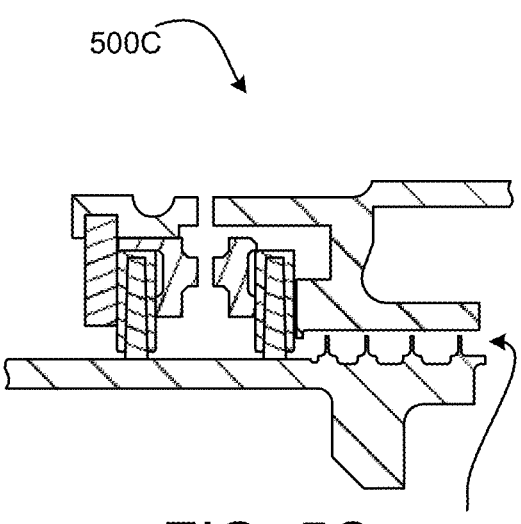
Figure 5D:
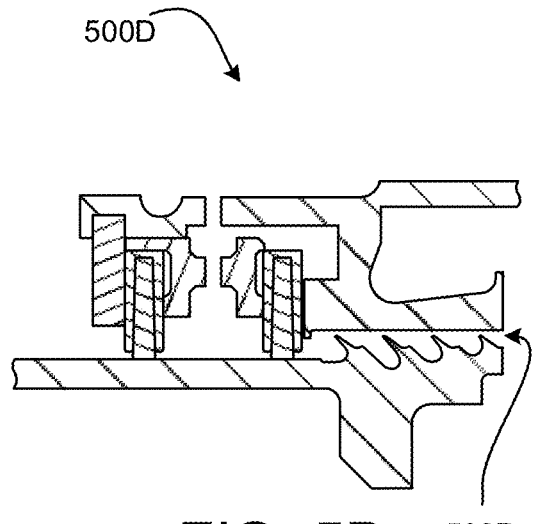

In various embodiments, and with reference to FIGS. 5A-5D, the seal assembly 500A, 500B, 500C, and 500D may include one or more labyrinth seal configurations to further facilitate the sealing capabilities of the seal assembly 500A, 500B, 500C, and 500D. For example, seal the assembly 500A, 500B may include one or more seal lands that have a stepped configuration 580A, 580B (FIGS. 5A and 5B, respectively). In various embodiments, the seal assembly 500C, 500D may include one or more seal lands that have a straight configuration 580C, 580D (FIGS. 5C and 5D, respectively). In various embodiments, the knife edges of the seal assembly 500A, 500C may have a straight orientation 580A, 580C (FIGS. 5A and 5C, respectively). In various embodiments, the knife edges of the seal assembly 500B, 500D may have a canted/tilted orientation 580B, 580D (FIGS. 5B and 5D, respectively).

Figure 6:
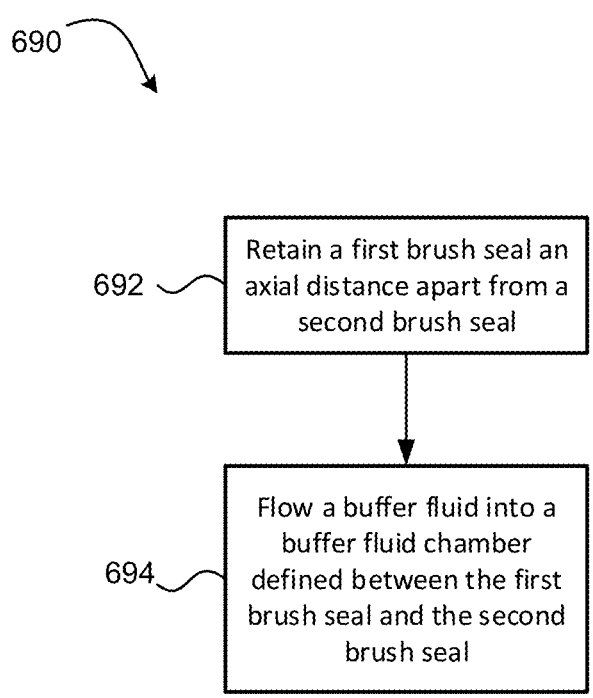
FIG. 6 illustrates a schematic flow chart diagram of a method of sealing a bearing system of a gas turbine engine, in accordance with various embodiments.

In various embodiments, and with reference to FIG. 6, a method 690 of sealing a bearing system of a gas turbine engine is disclosed. The method 690 includes, according to various embodiments, retaining a first brush seal an axial distance apart from a second brush seal at step 692. The method 690, according to various embodiments, further includes flowing a buffer fluid into a buffer fluid chamber defined between the first brush seal and the second brush seal at step 694.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly for a rotatable component having an axis of rotation, the seal assembly comprising:
    a first seal mounted to a housing and configured to be in sealing engagement with the rotatable component;
    a second seal mounted to the housing an axial distance apart from the first seal and configured to be in sealing engagement with the rotatable component, wherein the axial distance is parallel with the axis of rotation;
    a buffer fluid chamber defined between the first seal and the second seal;
    a buffer fluid inlet in fluid providing communication with the buffer fluid chamber; and
    a spacer disposed in the buffer fluid chamber between the first seal and the second seal, wherein the spacer is monolithic and directly contacts the first seal and the second seal;
    wherein a bearing compartment is defined axially outward, relative to the buffer fluid chamber, of the first seal and the second seal.

2. The seal assembly of claim 1, wherein the first seal is a first brush seal and the second seal is a second brush seal.

3. The seal assembly of claim 1, wherein the first seal is configured to separate a gas from a buffer fluid in the buffer fluid chamber.

4. The seal assembly of claim 3, wherein the second seal is configured to separate the buffer fluid in the buffer fluid chamber from oil in the bearing compartment.

5. The seal assembly of claim 3, wherein the second seal is configured to separate the buffer fluid in the buffer fluid chamber from an oil mist in the bearing compartment.

6. The seal assembly of claim 1, wherein the first seal and the second seal are mechanically retained to the housing.

7. The seal assembly of claim 6, wherein the spacer is H-shaped.

8. The seal assembly of claim 7, wherein the spacer extends between and directly contacts the first seal and the second seal to mechanically retain the first seal and the second seal in static engagement with the housing.

9. A seal assembly of a bearing system of a gas turbine engine, the seal assembly comprising:
a rotatable component having an axis of rotation;
a static housing;
a first seal mounted to the static housing in sealing engagement with the rotatable component;
a second seal mounted to the static housing an axial distance apart from the first seal in sealing engagement with the rotatable component, wherein the axial distance is parallel with the axis of rotation;
a buffer fluid chamber defined between the first seal and the second seal; and
a buffer fluid inlet in fluid providing communication with the buffer fluid chamber, wherein the buffer fluid inlet is configured to deliver buffer fluid radially through a wall of the rotatable component.

10. The seal assembly of claim 9, further comprising a spacer disposed between the first seal and the second seal, wherein the spacer is monolithic and extends between and directly contacts the first seal and the second seal, wherein the first seal is a first brush seal and the second seal is a second brush seal.

11. The seal assembly of claim 10, wherein the first brush seal is configured to separate a gas from a buffer fluid in the buffer fluid chamber.

12. The seal assembly of claim 11, wherein the second brush seal is configured to separate the buffer fluid in the buffer fluid chamber from oil in a bearing compartment of the gas turbine engine.

13. The seal assembly of claim 11, wherein the second brush seal is configured to separate the buffer fluid in the buffer fluid chamber from an oil mist in a bearing compartment of the gas turbine engine.

14. The seal assembly of claim 12, wherein the static housing has an annular structure that is concentric with the axis of rotation.

15. The seal assembly of claim 14, wherein the static housing comprises a passage in a bottom portion of the annular structure configured to allow oil leaking through the second brush seal from the bearing compartment into the buffer fluid chamber to drain into the bearing compartment.

16. The seal assembly of claim 9, further comprising at least one labyrinth seal configuration.

17. The seal assembly of claim 16, wherein the labyrinth seal configuration is a stepped configuration such that each seal land of the labyrinth seal configuration is radially offset from an adjacent seal land of the labyrinth seal configuration.

18. The seal assembly of claim 16, wherein the labyrinth seal configuration comprises at least one canted knife edge.

19. A method of sealing a bearing system of a gas turbine engine, the method comprising:
retaining a first brush seal an axial distance apart from a second brush seal, wherein retaining the first brush seal the axial distance apart from the second brush seal comprises positioning a monolithic spacer between the first brush seal and the second brush seal such that the monolithic spacer extends between and directly contacts both the first brush seal and the second brush seal; and
flowing a buffer fluid into a buffer fluid chamber defined between the first brush seal and the second brush seal, wherein a bearing compartment is defined axially outward, relative to the buffer fluid chamber, of the first brush seal and the second brush seal.

20. The method of claim 19, wherein the monolithic spacer has an H-shape.

* * * * *